(12) United States Patent
Lipowski (10) Patent No.: US 10,495,529 B2
(45) Date of Patent: Dec. 3, 2019

(54) ELECTRICAL FULL BRIDGE STRAIN GAUGE CIRCUIT, LOAD CELL, AND LOAD DETECTION DEVICE FOR USE IN LIFTING PLATFORMS, TRUCKS, AND OTHER MACHINES

(71) Applicant: MOBA Mobile Automation AG, Limburg (DE)

(72) Inventor: Norbert Lipowski, Limburg (DE)

(73) Assignee: MOBA Mobile Automation AG, Limburg (DE)

( * ) Notice: Subject to any disclaimer, the term of this patent is extended or adjusted under 35 U.S.C. 154(b) by 324 days.

(21) Appl. No.: 15/430,094

(22) Filed: Feb. 10, 2017

(65) Prior Publication Data
US 2017/0234747 A1   Aug. 17, 2017

(30) Foreign Application Priority Data
Feb. 11, 2016  (EP) .................................... 16155196

(51) Int. Cl.
*G01L 1/22* (2006.01)
*B66F 11/04* (2006.01)
(Continued)

(52) U.S. Cl.
CPC .......... *G01L 1/2262* (2013.01); *B66F 11/044* (2013.01); *B66F 17/006* (2013.01);
(Continued)

(58) Field of Classification Search
CPC . G01L 1/16; G01L 1/22; G01L 1/2262; G01L 1/2268; G01L 1/2281; G01L 1/246;
(Continued)

(56) References Cited

U.S. PATENT DOCUMENTS 3,816,812 A * 6/1974 Alber .................... G01R 27/205
324/421
4,120,195 A * 10/1978 Leeming ................ G01L 1/2268
73/765
(Continued)

FOREIGN PATENT DOCUMENTS

CN          1148889 A       4/1997
CN        101244792 A       8/2008
(Continued)

OTHER PUBLICATIONS

SIPO, First Office Action dated Nov. 29, 2018, on corresponding CN patent appl'n No. 201710072892X.

*Primary Examiner* — Harshad R Patel
*Assistant Examiner* — Nigel H Plumb
(74) *Attorney, Agent, or Firm* — Law Office of Leo Zucker (57) ABSTRACT

An electrical full bridge strain gauge circuit, load cell, and load detection device for use in lifting platforms such as forklifts, loaders, cranes, and trucks, wherein the detection of the weight of a given load is desirable. The circuit includes a full bridge strain gauge configuration having a pair of voltage supply terminals and a pair of signal terminals, first resistors connected in series between the supply terminals and having a first tap between two resistors, and second resistors connected in series between the signal terminals and having a second tap between two resistors. A comparer has input terminals connected to the first and the second taps, for comparing a first voltage potential at the first tap with a second voltage potential at the second tap, and for producing a corresponding drift signal.

16 Claims, 8 Drawing Sheets

(51) Int. Cl.
*B66F 17/00* (2006.01)
*G01L 1/24* (2006.01)
*G08B 21/18* (2006.01)
*G01G 3/14* (2006.01)

(52) U.S. Cl.
CPC .......... *G01L 1/2268* (2013.01); *G01L 1/2281* (2013.01); *G01L 1/246* (2013.01); *G08B 21/182* (2013.01); *B66F 11/046* (2013.01); *G01G 3/1414* (2013.01)

(58) Field of Classification Search
CPC .... B66F 11/044; B66F 17/006; B66F 11/046; G08B 21/182; G08B 21/00; G01G 3/1414; G01G 3/14; G01G 19/00
See application file for complete search history.

(56) References Cited

U.S. PATENT DOCUMENTS

| | | | | |
|---|---|---|---|---|
| 5,296,655 A | * | 3/1994 | Sargent | G01G 23/163 177/199 |
| 5,369,226 A | * | 11/1994 | Griffen | G01G 3/1406 177/211 |
| 5,777,235 A | * | 7/1998 | Altwein | G01D 3/028 73/763 |
| 9,249,004 B2 | * | 2/2016 | Bowden | B66F 11/046 |
| 2003/0174064 A1 | * | 9/2003 | Igarashi | B66F 11/046 340/685 |
| 2010/0181143 A1 | * | 7/2010 | Bowden | B66F 11/046 182/112 |

FOREIGN PATENT DOCUMENTS

| | | |
|---|---|---|
| CN | 101813707 A | 8/2010 |
| CN | 103234689 A | 8/2013 |
| CN | 103557969 A | 2/2014 |
| CN | 103575376 A | 2/2014 |
| DE | 2332764 A1 | 1/1973 |
| EP | 1382562 A1 | 1/2004 |
| EP | 2155597 B1 | 1/2015 |
| FR | 3000200 A1 | 6/2014 |
| GB | 2450360 A | 12/2008 |
| GB | 2463915 A | 3/2010 |
| WO | 2008155554 A1 | 12/2008 |

* cited by examiner

ELECTRICAL FULL BRIDGE STRAIN GAUGE CIRCUIT, LOAD CELL, AND LOAD DETECTION DEVICE FOR USE IN LIFTING PLATFORMS, TRUCKS, AND OTHER MACHINES

CROSS-REFERENCE TO RELATED APPLICATION

This application claims priority from European Application No. 16155196.5, which was filed on Feb. 11, 2016, and is incorporated herein by reference in its entirety.

BACKGROUND OF THE INVENTION

Field of the Invention

The present invention relates to an electrical circuit having an SG full bridge circuit, to a load cell, to a load detection device, for example for a working platform, and to a vehicle comprising a load detection device. In particular, the present invention relates to a drift indicator for monitoring the equilibrium within the Wheatstone SG full bridge.

Discussion of the Known Art

Full bridge circuits comprising SG (strain gauge) elements may be used to determine load states at mechanically deformable elements. An example of this is a load or weigh cell which is arranged between a working platform and a crane, wherein a deformation of elements of the load cell allows drawing conclusions as to a loading by the working platform on the crane.

In a correctly operating load cell comprising an SG full bridge, there is an equilibrium as regards the electrical voltages occurring. A zero drift destroys this equilibrium so that a load state measureable by the electrical voltages deviates from an actual load state. This may result in the crane to be overloaded, since an overload is indicated too late.

In order to avoid such miss-indications, redundant SG full bridges are used in order to recognize zero drift of a SG full bridge by another one. However, this is of disadvantage in that, with deviating results of the two redundant SG full bridge circuits, only a deviating result is obtained which, however, may also be attributed to different material expansion at different locations of the different SG full bridges. In addition, several full bridge circuits have to be arranged and evaluated.

Some known concepts provide for monitoring the output signal of the full bridge circuit in an unloaded state. A deviation of the signal value from a zero value can be recognized to be the zero drift. However, this is not possible during operation since the operation itself produces a signal value which is different from the zero value.

Consequently, a concept would be desirable which allows reliably recognizing or ensuring operability of an SG full bridge.

SUMMARY OF THE INVENTION

According to an embodiment, an electrical circuit may have: a strain gauge full bridge circuit; a first resistor series connection connected between the terminals of an energy supply gate of the strain gauge full bridge circuit and having a first tap between two resistors; a second resistor series connection connected between the terminals of a signal gate of the strain gauge full bridge circuit and having a second tap between two resistors; and comparing means connected to the first tap and the second tap and configured to perform a comparison between a first voltage potential at the first tap and a second voltage potential at the second tap.

Another embodiment may have a load cell with a first side and a second side, having an electrical circuit as mentioned above, configured to provide a signal at the signal gate based on a mechanical loading at the first side based on a force acting on the second side.

According to another embodiment, a load detection device for a lifting machine may have: a mechanism for moving a load, wherein the mechanism may be mounted to a base; and a load cell as mentioned above arranged between the mechanism and the load; wherein the mechanism and the load are connected to each other by the load cell.

Another embodiment may have a vehicle having a load detection device as mentioned above, wherein the mechanism is mounted to a vehicle chassis.

The central idea of the present invention is having recognized that a symmetry of a full bridge circuit may be monitored by a symmetrical resistor circuit which is connected to the gates of the full bridge circuit, by arranging resistor series connections such that, between resistors of the resistor series connection, pairs of voltages which are also symmetrical to each other are generated which are influenced by the symmetry of the full bridge circuit and allow a hint as to the state of the full bridge circuits.

In accordance with an embodiment of the present invention, an electrical circuit comprises an SG full bridge circuit, a first resistor series connection and a second resistor series connection. The first resistor series connection is connected between the terminals of an energy supply gate of the SG full bridge circuit and comprises a first tap between two resistors. The second resistor series connection is connected between the terminals of a signal gate of the SG full bridge circuit and comprises a second tap between two resistors. During operation of the electrical circuit, a voltage which indicates a size of zero drift may be obtained between the first tap and the second tap. It is of advantage with this embodiment that the drift voltage is not dependent on a loading of the SG full bridge circuit so that the zero drift may also be recognized during load states of the SG full bridge circuit.

In accordance with further embodiments, the electrical circuit comprises comparing means connected to the first tap and the second tap and configured to perform a comparison between a first voltage potential at the first tap and a second voltage potential at the second tap. It is of advantage that the comparing means can measure or determine a difference voltage between the voltage potentials by comparing the two voltage potentials and, thus, detect a drift of the full bridge circuit.

In accordance with further embodiments, the comparing means is configured to provide, based on the comparison of the voltage potentials, an output signal indicating an error of one of the strain gauges (SGs) of the SG full bridge circuit. It is of advantage here that the output signal may be provided to other devices and be used by these in order to influence an operation of equipment the state of which is to be monitored by the electrical circuit, like a crane device.

In accordance with further embodiments, the comparing means is configured to provide, based on the comparison, an output signal which indicates an error of one of the resistors of the first or second resistor series connection. Shifting an equilibrium and/or a symmetry of the resistor series connection relative to one another or within the respective resistor series connection may result in a shift of the first or second voltage potential and in a drift voltage occurring. It is of advantage here that the monitoring components, that is the resistor series connections, may also be monitored.

In accordance with further embodiments, the comparing means is configured to correct the second voltage potential relative to a temperature-based change in resistance of the first or second resistor series connection in order to receive temperature information indicating a temperature at the resistor to be corrected, and correct the temperature-based change in the resistor to be corrected based on the temperature information. It is of advantage here that errors of the reference resistors of the resistor series connections may be compensated by a change in temperature so that the reliability of the electrical circuit is high.

In accordance with further embodiments, the comparing means is configured to provide an output signal when a comparison value of the comparison reaches or exceeds a threshold value. It is of advantage here that the output signal and/or an error signal is only generated when the threshold value is reached or exceeded. Thus, changes of the elements within tolerances and/or manufacturing tolerances can be compensated and erroneous alarm signals can be avoided.

Further embodiments of the present invention provide a load cell comprising a first side and a second side. The load cell comprises an electrical circuit in accordance with embodiments described herein, configured to provide a signal at the signal gate of the electrical circuit based on a mechanical load at the first side based on a force acting on the second side. It is of advantage here that a drift in the load cell may be recognized efficiently and while saving space since arranging a second full bridge circuit may be dispensed with. In addition, a zero drift occurring may also be recognized during operation of the load cell.

Further embodiments of the present invention provide a load detection device for a working platform comprising a crane mechanism for moving the working platform, wherein the crane mechanism may be mounted to a base, and a load cell arranged between the crane mechanism and the working platform. The crane mechanism and the working platform are connected to each other by the load cell. It is of advantage here that the loading of the crane mechanism by the working platform may be detected by means of the load cell which comprises the electrical circuit, during operation of the crane mechanism. A rotational, for example annual, checking of the load cell here may be omitted entirely or is necessitated only in the case of an error (zero drift occurring). Alternatively, the checking interval of the load cell may advantageously be prolonged, for example to every two years. Thus, the present invention also saves costs.

Further embodiments of the present invention provide a vehicle comprising a load detection device in accordance with embodiments described herein. The crane mechanism is mounted to a vehicle chassis.

BRIEF DESCRIPTION OF THE DRAWING FIGURES

Embodiments of the present invention will be detailed subsequently referring to the appended drawings, in which.

DETAILED DESCRIPTION OF THE INVENTION

Before discussing below in greater detail embodiments of the present invention referring to the drawings, it is pointed out that identical elements, objects and/or structures or those of equal function or equal effect, in the different figures, are provided with same reference numerals so that the description of these elements illustrated in different embodiments is mutually exchangeable and/or mutually applicable.

Embodiments described below refer to a drift or zero drift of a full bridge circuit. The drift or zero drift refers to a deviation in a measuring voltage detectable at the full bridge circuit from a set voltage in a reference state. The reference state may be understood to be an unloaded state or calibrating state. Starting from the reference state, a first signal may increase with an increasing (mechanical) loading of the full bridge circuit to an extent to which a second signal decreases so that an increasing quantity of a voltage difference represents a measure of the loading of the full bridge circuit. In the reference state, a reference voltage may be present, like a voltage difference of 0 V. Due to errors in the full bridge circuit, a voltage difference unequal to 0 V may occur in the reference state, which will be referred to below as drift or zero drift of the full bridge circuit.

Figure 1:
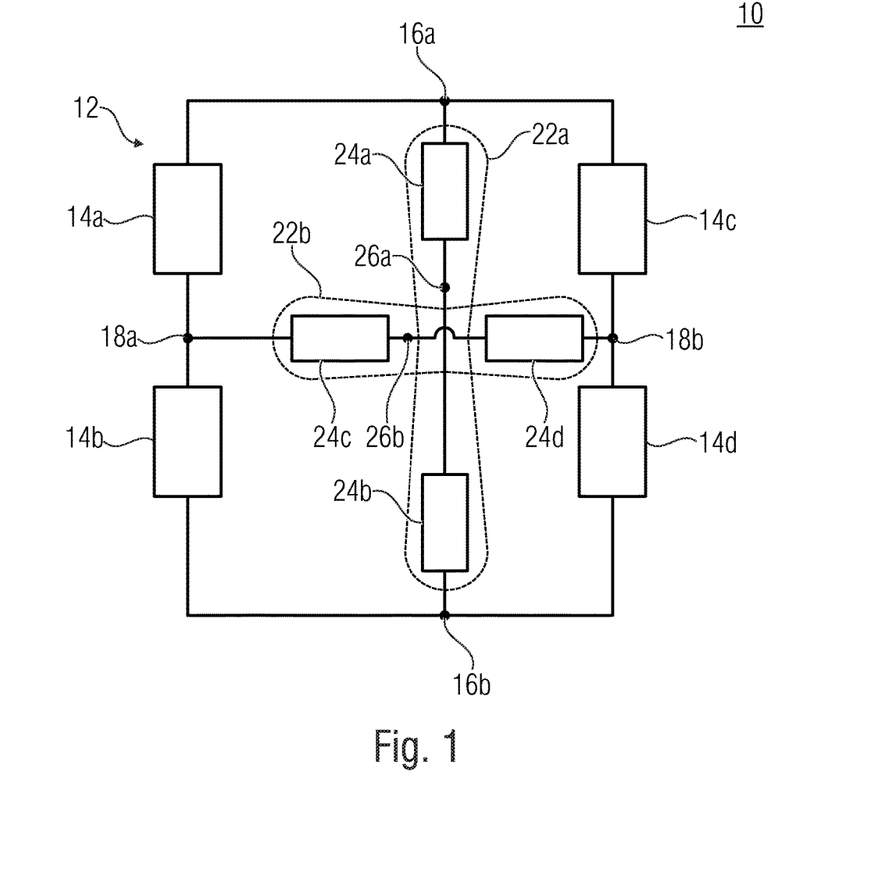
FIG. 1 is a schematic block circuit diagram of an electrical circuit in accordance with an embodiment.

FIG. 1 shows a schematic block circuit diagram of an electrical circuit 10 in accordance with an embodiment. The electrical circuit 10 comprises an SG full bridge circuit 12 comprising four SGs (strain gauges) 14a to 14d. The SGs 14a to 14d may be connected to form a Wheatstone bridge circuit. The SG full bridge circuit 12 comprises energy supply terminals 16a and 16b which form an energy supply gate of the SG full bridge circuit. Two series connections each comprising two of the SGs 14a and 14b or 14c and 14d are arranged between the terminals 16a and 16b.

The SG full bridge circuit 12 additionally comprises signal terminals 18a and 18b which form a signal gate of the SG full bridge circuit. The energy supply gate may be connected to a supply voltage for the SGs 14a to 14d, whereupon a signal may be obtained at the signal gate based on a change in a state of the SGs. The state may be a loaded state which results in an expansion or compression of the SGs.

In addition, the electrical circuit 10 comprises a first resistor series connection 22a connected between the terminals 16a and 16b. The resistor series connection 22a comprises two serially connected resistors 24a and 24b between which a tap 26a is arranged. A potential between the resistors 24a and 24b may be tapped or is measureable at the tap 26a.

A second resistor series connection 22b is connected between the terminals 18a and 18b and comprises two serially connected resistors 24c and 24d between which a tap 24b is arranged. A potential between the resistors 24c and 24d may be tapped or is measureable at the tap 26b.

Advantageously, the SGs 14a to 14d are implemented to be equal. This means that a mechanical and/or electrical deviation between the SGs 14a to 14d is small, approximately 0 or equaling 0. Advantageously, the resistors 24a to 24d are implemented to be equal. This means that they may comprise an equal resistance, equal mechanical loadability and/or equal temperature-induced changes in resistance. In accordance with embodiments, it is provided for the resistors to exhibit an equal temperature-induced change in resistance, as will be described in connection with FIG. 3c. The symmetry between the SGs and the symmetry between the resistors allows recognizing changes in elements occurring, as will be discussed referring to FIGS. 3a to 3c.

The SGs may be electrical resistors, the resistances of which change based on a mechanical deformation. Alternatively, the SGs may also be different measuring elements sensitive to expansion, like optical SGs which are referred to as fiber Bragg gratings, for example. With optical SGs, an expansion or compression may be determined by shifting spectra of electromagnetic radiation. This shift may be transformed to an electrical voltage using optoelectronic transducers so that the principles of the full bridge circuit may unlimitedly be applied to optical SGs as well.

Embodiments described herein may also be applied to other full bridge circuits. Instead of the SGs, measuring elements may be arranged for detecting any physical quantity, like a temperature, pressure or pH value, which are electrically conductive or output an electrical signal. The elements of the resistor series connection may be implemented by electrically conducting elements or elements providing an electrical signal, which are influenced by the physical quantity to a changed extent (less, approximately not at all or more).

The resistors 24a to 24d may be any resistors. Advantageously, the resistors 24a to 24d are formed from high-quality temperature-stable resistors. The resistance here may be as desired. In order to keep an energy consumption of the electrical circuit 10 low, resistors comprising a resistance of at least 1 kΩ and at most 100 MΩ, of at least 5 kΩ and at most 80 MΩ, or of at least 8 kΩ and at most 50 MΩ, for example 10 kΩ, may be used. This allows high flexibility in the power management of the electrical circuit 10. Thus, it is also possible for the resistors 24a to 24d to comprise a resistance in the range or order of magnitude of approximately 350 Ω to 1 kΩ and/or to correspond approximately to a resistance of the SGs.

The resistor series connections 22a and 22b here may each be described to be a voltage divider at the tap 24a or 24b of which an auxiliary voltage may be obtained and detected. It is pointed out that, even though the resistor series connections 22a and 22b are each described so as to comprise two resistors 24a and 24b and 24c and 24d, respectively, each of the resistors 24a to 24d may also be formed by a plurality or multitude of resistors. Although embodiments discussed herein are described such that, in an error-free case, half of the voltage between the terminals 16a and 16b and between the terminals 18a and 18b each is obtained at the taps 26a and 26b, electrical circuits in accordance with further embodiments are configured such that a voltage level differing from 50% (relative to the supply potential) is obtained at the taps 26a or 26b. If the resistors 24a and 24b exemplarily comprise mutually different resistances, any voltage level may be obtained by the asymmetrical voltage dividers obtained in this way. The same applies to the resistor series connection 22b.

Figure 2:
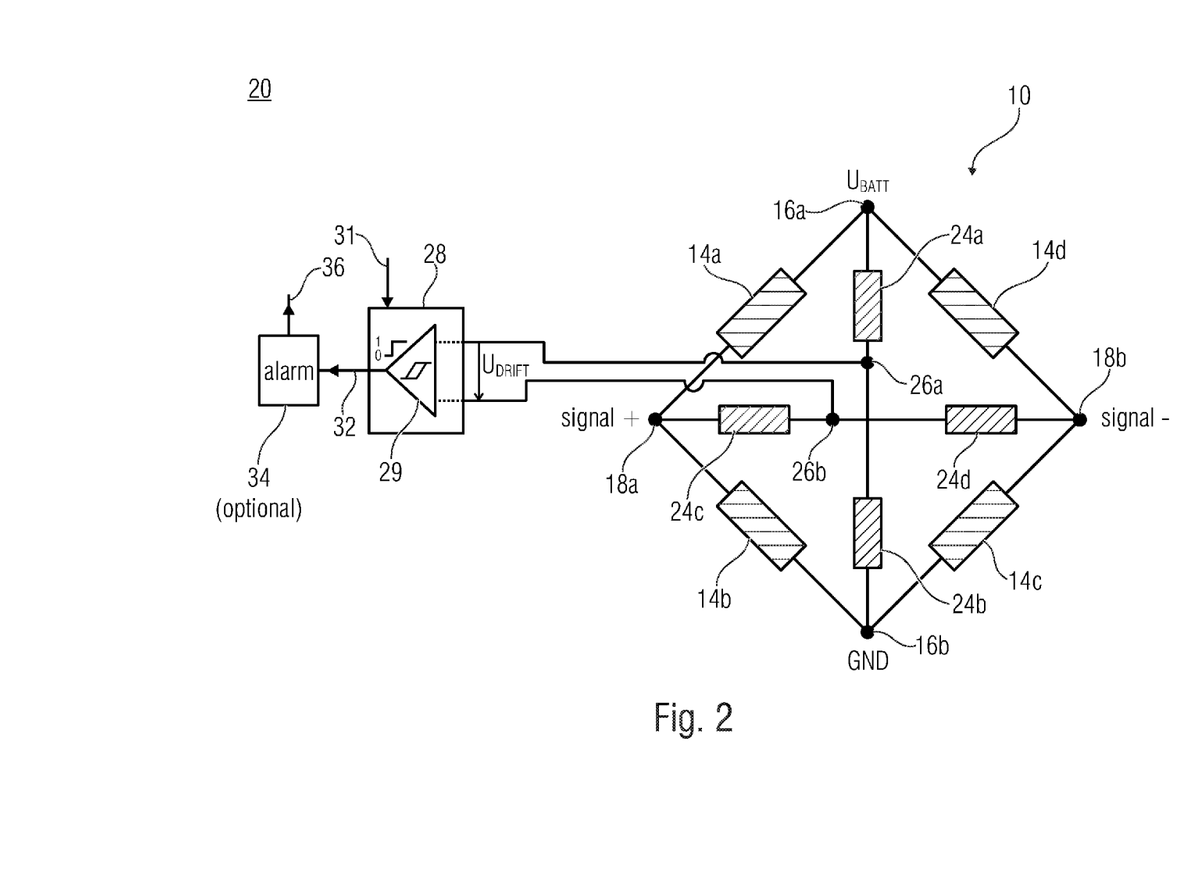
FIG. 2 is a schematic block circuit diagram of an electrical circuit in accordance with another embodiment.

FIG. 2 shows a schematic block circuit diagram of an electrical circuit 20 in accordance with another embodiment.

The electrical circuit 20 comprises the electrical circuit 10, as is described in connection with FIG. 1, and comparing means 28 connected to the first tap 26a and the second tap 26b. The comparing means 28 is configured to perform a comparison between the first voltage potential at the first tap 26a and the second voltage potential at the second tap 26b. This may take place such that a respective voltage potential at the tap 26a and the tap 26b is detected relative to a reference voltage, for example 0 V or ground (GND) and compared to one another. Alternatively, the two voltage potentials at the taps 26a and 26b may be compared directly. A difference voltage $U_{DRIFT}$ forms between the voltage potentials at the taps 26a and 26b, which is detected by the comparing means 28. In a symmetrical or error-free state where, for example, the SGs 14a to 14d and the resistors 24a to 24d are formed to be equal, the voltage $U_{DRIFT}$ comprises a value of 0 V or approximately 0 V.

The comparing means 28 is configured to provide an output signal 32 which indicates an error of one of the SGs 14a to 14d of the SG full bridge circuit. Alternatively or additionally, the comparing means may be configured to provide the output signal 32 based on the comparison of the voltage potentials such that it indicates an error of one of the resistors 24a to 24d. Outputting the output signal may be dependent on a condition, like when the comparing means comprises a logic. Exemplarily, the comparing means 28 may comprise a comparator 29, for example for checking fulfillment of a condition (reaching, falling below or exceeding a threshold value) of the output signal, in order to output the output signal 32 in a digitalized form. Alternatively, the output signal 32 may also be an amplified, non-amplified or attenuated version of the voltage course of the voltage $U_{DRIFT}$.

Thus, it is also possible for the comparing means 28 to comprise a microcontroller having at least two A/D differential transducers (not illustrated here), wherein the A/D differential transducers are connected to the first tap 26a and the second tap 26b and to the signal terminals 18a (signal+) and 18b (signal−). In addition, the microcontroller comprises the usual periphery, like, for example, a CPU, a memory (RAM, ROM), for storing program code and further data, etc. Using the microcontroller, the output signal fulfilling a condition (reaching, falling below or exceeding a threshold value) may also be checked and/or the output signal 32 be output in a digitalized form. Alternatively, the output signal 32 may also be an amplified, non-amplified or attenuated version of the voltage course of the voltage $U_{DRIFT}$. A temperature sensor may also be integrated in the microcontroller. However, it is also feasible to connect to the microcontroller a separate and/or additional temperature sensor or a temperature-dependent resistor.

In accordance with an advantageous implementation, the comparing means 28 is configured to provide the output signal 32 when a resistor 24a to 24d or an SG 14a to 14d exhibits an error. An error may, for example, be a mechanical or electrical damage of a resistor 24a to 24d or SG 14a to 14d. Alternatively or additionally, an SG may also be considered to be erroneous when a substrate or material which the SG 14a to 14d is mounted to, comprises a local deformation so that the SG, in at least one, in several or in all the load states of the substrate, comprises a resistance differing from other SGs. Further error cases detectable are erroneous connections between lines and SGs or resistors or age-induced changes in the elements, for example caused by material fatigue. Even when some of these errors are outside the SGs or resistors, they can be detected, since they have an effect on the electrical conductivity of the circuit or the symmetry thereof.

The electrical circuit 20 may comprise an optional alarm signaling unit 34 configured to receive the output signal 32 and output an alarm signal 36. The alarm signal may be any signal, like electrical or optical. Any conditioning may be defined in the alarm signaling unit 34 between outputting the alarm signal 36 and the output signal 32. Exemplarily, the alarm signaling unit may be configured to output the alarm signal 36 when an amplitude, frequency or current value of the output signal 32 reaches or exceeds a threshold value. The output signal 32 is, for example, directly or indirectly proportional to the amplitude of the voltage $U_{DRIFT}$ and a threshold value to be reached or to be exceeded is defined in the alarm signaling unit 34. Alternatively, the alarm signaling unit is configured to output the alarm signal 36 when the output signal 32 is applied or is not applied, like when the comparing means 28 is configured to output the output signal 32 when an amplitude of the voltage $U_{DRIFT}$ reaches or exceeds the threshold value. Alternatively, the alarm unit may also be formed to be part of the comparing means 26.

When applying a supply voltage between the terminals 16a and 16b, as is indicated by $U_{BATT}$ and GND, at the terminals 18a and 18b, a signal in the form of a potential difference between the terminals 18a and 18b may be obtained, as is indicated by signal+ and signal−. The function of the electrical circuit 10 will be discussed in greater detail below.

In addition, the comparing means 28 may be configured to receive temperature information 31. The temperature information may indicate a temperature at one or several resistors 24a to 24d. The comparing means may be configured to correct a temperature-based change of a resistor to be corrected or several resistors to be corrected based on the temperature information 31 relative to a resistance. The comparing means 28 may thus be configured to correct a corresponding potential at the tap 26a and/or 26b relative to the temperature-induced change in resistance correspondingly. Here, a temperature characteristic curve of the resistors and/or reference resistors 24a to 24d may, for example, be stored in the comparing means. The difference voltage of the reference bridge, i.e. the voltage $U_{DRIFT}$, may be digitalized by an ND (analog-to-digital) transducer. After obtaining a temperature correction, this (corrected) measuring value may be correlated with a load state of a device where the SG full bridge circuit 12 is arranged, for example with the reference state or 0 kg. Any change around 0 kg may be interpreted to be a drift in kilogram, that is mechanical loading of the SG full bridge circuit 12, when using the same calibration factor used for calculating the actual loading of the SG bridge, for the resistors. Applying a temperature characteristic curve, defined before, to the output signal of the two voltage dividers or resistor series connections 22a and 22b in dependence on the temperature currently measured eliminates a temperature influence on the resistors 24a/24b and 24c/24d.

Thus, the temperature characteristic curve may be realized, or be determined or found during operation, as a list of correction factors relative to the respective temperature (so-called look-up table). When using the temperature characteristic curve, the same output voltage of the voltage dividers 22a and 22b will be obtained over the entire temperature range.

Subsequently, making reference to FIGS. 3a to 3c, the mode of functioning of the electrical circuit 10 will be discussed, wherein the discussion also applies unlimitedly to the electrical circuit 20.

Figure 3A:
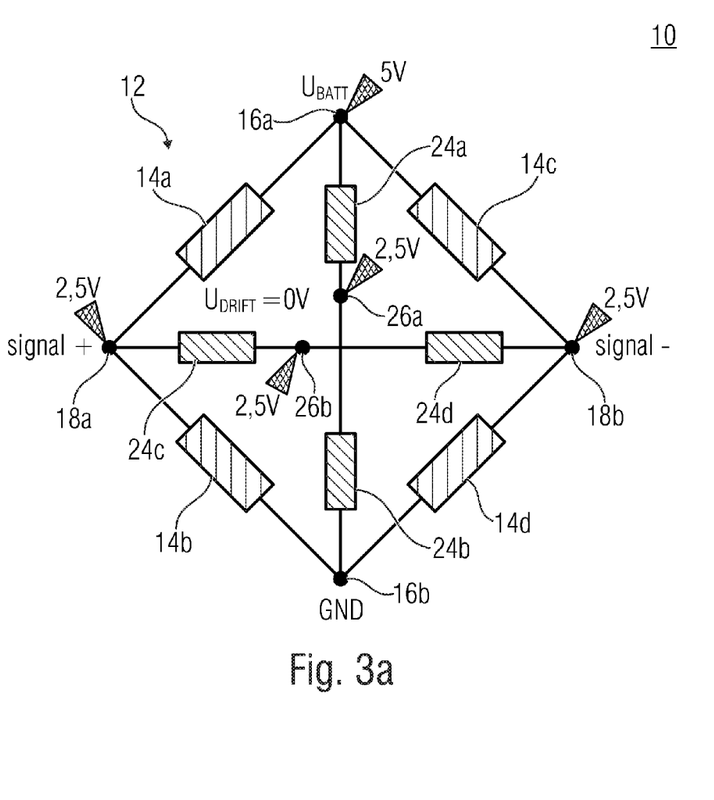
FIG. 3a shows a first state of the electrical circuit in accordance with FIG. 1 with a supply voltage applied.

FIG. 3a shows a first state of the electrical circuit 10 with a supply voltage applied. The first state is an unloaded case of the SG full bridge circuit 12 and error-free components thereof and of the two resistor series connections. For illustration purposes, embodiments below will be described such that the voltage $U_{BATT}$ comprises a voltage difference of 5 V relative to the reference voltage GND. In accordance with other embodiments, any supply voltage may be applied to the SG full bridge circuit 12, for example at least 0.1 V and at most 1000 V, at least 1 V and at most 100 V or at least 2.5 V and at most 20 V.

Based on the symmetry of the electrical circuit 10, the supply voltage $U_{BATT}$ drops equally across the SGs 14a and 14b and equally across the SGs 14c and 14d. Half the supply voltage, that is 2.5 V, is each applied to the terminals 18a and 18b of the signal gate, the result being an output signal of the SG full bridge circuit in the form of (signal+)−(signal−) equaling 0 V. Consequently, there is a voltage of 2.5 V (relative to the reference voltage GND) of 2.5 V applied to the tap 26b. The supply voltage $U_{BATT}$ also drops equally across the symmetrical, that is equal resistors 24a and 24b so that a voltage of 2.5 V is also applied to the tap 26a. The drift voltage $U_{DRIFT}$ between the taps 26a and 26b consequently is 0 V.

In other words, in an unloaded case, a voltage of approximately 0, like 0 mV, is measured in the diagonal of the SG full bridge circuit 12 between signal+ and signal−. In the ideal case, the SG resistors 14a to 14d are equal so that the following applies: signal+=signal−=2.5 V. Thus, the auxiliary voltages at the taps 26a and 26b also equal 2.5 V. The check voltage may be indicated as the difference between the auxiliary voltages, wherein in the first case $U_{DRIFT}=0$ V applies.

Figure 3B:
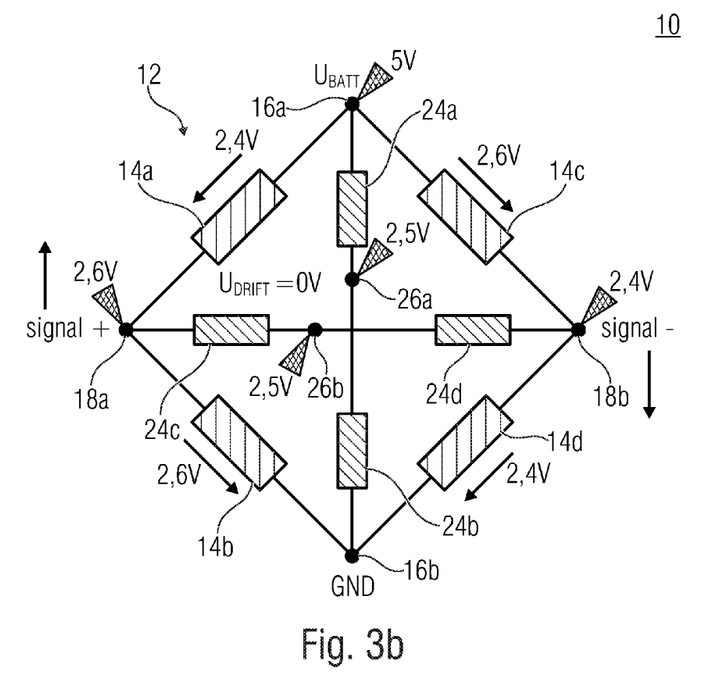
FIG. 3b shows the electrical circuit of FIG. 3a with mechanical loading of the cell.

FIG. 3b shows the electrical circuit 10 in a second case which describes mechanical loading of the cell, that is of the SG full bridge circuit 12. In the loaded state, the resistances of the SGs 14a and 14b and 14c and 14d may each change discordantly.

Exemplarily, the SG 14a may comprise a decreased resistance and the SG 14b an increased resistance. A potential of 2.6 V is, for example, applied to the terminal 18a. A potential of 2.4 V is, for example, applied to the terminal 18b. This results in a signal difference of 0.2 V between the terminals 18a and 18b. In the ideal case, this signal difference is symmetrical around the mean voltage of 2.5 V applied to the tap 26b. In the ideal case considered, the resistors 24a to 24d are not dependent on the mechanical deformation so that the potential of 2.5 V is still applied to the center tap 26a so that the voltage $U_{DRIFT}$ is still 0 V. This means that, in the loaded case, the auxiliary voltages may still be equal.

In other words, the SG resistors 14a to 14d may change uniformly in a loaded case. By the wiring, the voltage signal+ at the terminal 18a becomes greater and the voltage signal− at the terminal 18b becomes smaller. The signal voltage of the SG full bridge circuit 12 changes in correspondence with the difference. Due to the equilibrium principal, the auxiliary voltages, again settle to 2.5 V. Thus, the check voltage will remain at 0 V, like in the unloaded state.

This means that the drift voltage $U_{DRIFT}$ may be used as an indicator for the intactness of the elements also in the loaded case of the SG full bridge circuit 12. The comparing means may be configured to provide the output signal irrespective of a deformation of the SGs 14a to 14d. In addition, the comparing means may be configured to perform the comparison in a reference state, as is illustrated in FIG. 3a, and in a loaded state, as is illustrated in FIG. 3b, of the SG full bridge circuit 12.

Figure 3C:
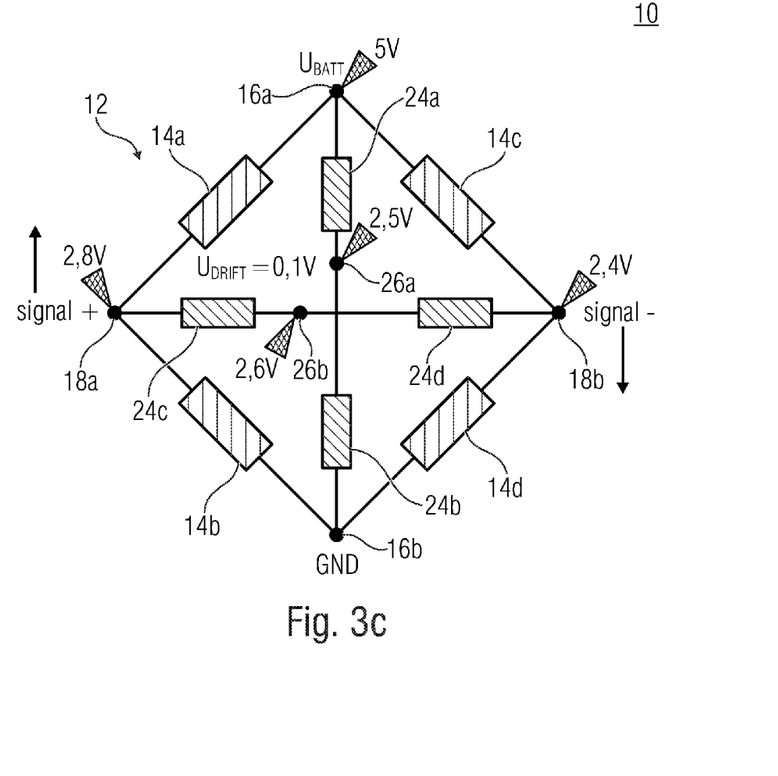
FIG. 3c shows the electrical circuit of FIG. 3b with an error occurring.

FIG. 3c shows the electrical circuit 10 in a third state where the SGs 14a to 14d are deformed mechanically so that the resistances thereof change, as is described in connection with FIG. 3b. In addition, the SG full bridge circuit 12 exhibits an error case which in the present example results from the fact that the SG 14a has changed its resistance irrespective of a load state, like due to damage or aging. Exemplarily, the resistance of the SG 14a has decreased. In the load state of FIG. 3b, also in this error state, a voltage of 2.4 V is obtained at the terminal 18b, the SG path of which is unimpeded. Due to the asymmetry of the SGs 14a and 14b, a different, somewhat higher potential forms at the terminal 18a. A potential of 2.8 V instead of 2.6 V forms, for example. Expressed in a simplifying manner, the equilibrium within the bridge is destroyed by changing the SG 14a. The result of this is that, with a comparable load state of the SG full bridge circuit 12 when compared to FIG. 3b, a changed and, thus, corrupted signal value is obtained at the terminal 18a and, thus, also in the difference voltage (signal+)−(signal−)=0.4 V.

The potential 2.5 V is still applied to the tap 26a, based on the symmetry of the resistors 24a and 24b. However, the electrical potential at the tap 26b is different due to the changed voltage at the terminal 18a so that a difference voltage $U_{DRIFT}$ of 0.1 V results, for example. This may be detected by the comparing means and information based thereon be output by the output signal.

In other words, in an error case, which means that an SG provides a drift, the auxiliary voltages at the taps 26a and 26b are no longer equal. Since the auxiliary voltage between the signal terminals 18a and 18b settles to a mean value of 2.6 V, the difference between the auxiliary voltages will no longer be 0 V. This may be interpreted to be a signal for the cell having experienced a zero drift—irrespective of loading.

As is illustrated in connection with FIG. 2, a threshold voltage may be set via a comparator, like the comparator 29, so that a minimum deviation (threshold value) of the drift voltage $U_{DRIFT}$ has to be reached or exceeded first in order for an output signal and/or error signal to be generated. The comparing means may be configured to output the output signal such that no drift present is indicated with equality of the voltage potential at the tap 26a and the voltage potential at the tap 26b and that drift of the electrical circuit present is indicated with inequality of the voltage potentials at the taps 26a and 26b.

In order to obtain high robustness of the electrical circuit, comparing means 28 arranged may be configured to correct one or several of the signals obtained relative to temperature-induced changes of the resistors 24a-d. The following consideration will be used here, wherein the values indicated are to be understood to be only exemplary and not limiting. When the resistors 24a to 24d exemplarily comprise a resistance R of 350Ω and a temperature change coefficient $T_K$ of 5 ppm (parts per million) and the SG full bridge circuit 12 is configured such that a signal change which corresponds to 1 mV/V with a loading of a structure of 1000 kg with the SG full bridge circuit 12 is obtained, the following scenario may be obtained with an exemplary supply voltage of 5V of the SG full bridge circuit:

Due to aging, manufacturing tolerances or damage, an SG within the measuring bridge may change such that the measuring bridge provides a signal change of, when converted, 1 kg. This corresponds to a signal voltage change between signal+ and signal− of 5 μV. The mean voltage of the two reference resistors 24c and 24d between the terminals 18a and 18b will correspondingly experience a change by 2.5 μV. With a change in temperature of 40° C., the error of the reference resistors is as follows: 5/1000000° C.*350 Ω*40° C.=70 mΩ; wherein the resistance of the reference resistors is within a preset or allowed temperature dependence (indicated in ppm). A voltage of 5 V*350 Ω/700.070 Ω=2.499750 V forms in a voltage divider of the reference resistors. This means that a change in the drift voltage of 2.5 V-2.499750 V=250 μV is obtained, which corresponds to a change of 100 kg. Such misinformation may result in a belated or early alarm signal or erroneous behavior of a controller. Based on the temperature compensation described before by the comparing means 28, such a deviation may be reduced or prevented so that high precision of the alarm or error signal is obtained, which is of advantage. It is to be mentioned in this context that resistors may frequently or even always be subject to a temperature dependence. Thus, not only the magnitude of the dependence may differ, but also the direction thereof (sign). Exemplarily, with a positive change in temperature, three out of four resistors may be subjected to an increase in resistance, but the fourth resistor to a decrease in resistance. Thus, it may be practical, as indicated above, to perform a comparison to one or several reference resistors which comprise a preset or allowed temperature dependence. This temperature dependence or the region within which a resistance of a reference resistor changes with a change in temperature, may be within the allowed total error limits which result for the reference resistors from tolerance, temperature dependence, etc.

Another advantage of embodiments described before is that the function of the resistors 24a-d may also be checked and/or monitored. If a resistor of a resistor series connection changes, like for production or aging reasons or due to a damage, the function of the electrical circuit, that is of the drift indicator, is not in danger. A drift signal differing from the normal state, like unequalling 0 V, will nevertheless be output in this case although it is not caused by the SGs 14a to 14d. However, this may nevertheless be interpreted such that checking the electrical circuit 10 is necessitated. From a security-technical point of view, a one-error case for both SGs and resistors is covered here. In addition, self-monitoring of the monitoring elements, that is of the resistors 24a to 24d, can be obtained.

Figure 4:
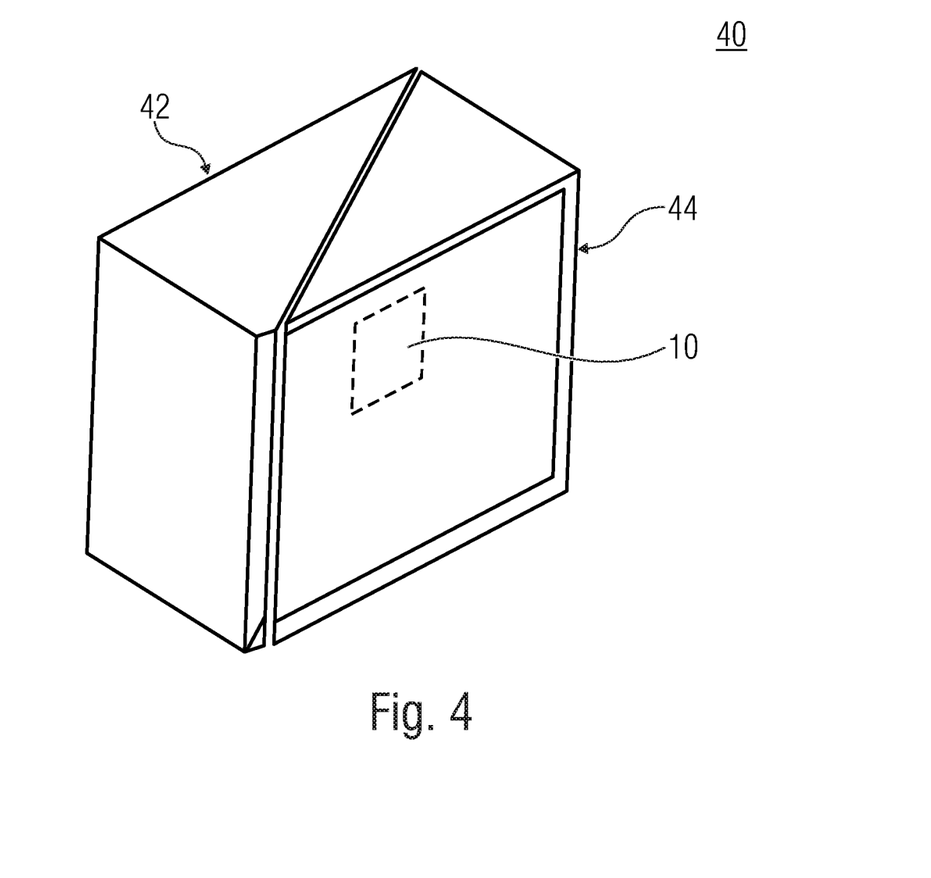
FIG. 4 is a schematic perspective view of a load cell in accordance with an embodiment.

FIG. 4 shows a schematic perspective view of a load cell 40 in accordance with an embodiment. The load cell 40 comprises the electrical circuit 10. Alternatively, the load cell 40 may also comprise the electrical circuit 20. The load cell 40 comprises a first side 42 and a second side 44 which may be connected to different mechanical components. Exemplarily, one side may be connected to a base and the other side to a reference structure. The reference structure may be a working platform, scales or a scale pan for weighing an object or the like. Moving the different mechanical components relative to one another or a force acting on at least one of the different mechanical components and, thus, on at least one of the sides 42 or 44, may result in loading or stress of the load cell 40, deformation of components thereof and, thus, loading of the SG full bridge circuit 12.

Alternatively or additionally, the force may also be a weight force, that is based on the load cell 40, weight loading of the first side 42 relative to the second side 44 or vice versa may also be detected.

Embodiments refer to load detection devices. Load detection devices are, for example, configured to detect a load acting on an element or a device. One field of application of load detection devices are lifting machines configured to lift a load. Exemplary lifting machines are cranes, forklift trucks, garbage or container trucks or wheel loaders, this enumeration not being exclusive. Load detection devices for lifting machines in accordance with embodiments described herein exemplarily comprise a mechanism for moving a load, like a crane, a lifting device or the like. The mechanism may be mounted to a base, like a vehicle or a structure relative to which the load is to be moved. A load cell is arranged between the mechanism and the load. The mechanism and the load are connected to each other by the load cell so that loading by the load on the mechanism and/or by the mechanism on the load may be detected precisely.

In other words, an electrical circuit or a load cell in accordance with embodiments described herein may be connected to lifting machines where a load and/or weight detection is desirable, like lifting platforms or other industrial applications, that is devices or systems. Exemplarily, but not finally, a load cell is connected to vehicles, like a forklift truck, a garbage truck (like a load cell for weighing a garbage can), a wheel loader (like as or in combination with pressure sensors at at least one hydraulics cylinder thereof), which means that a vehicle comprises a load detection device for a (lifting) mechanism. The electrical circuit or the load cell is, for example, arranged between the mechanism and the load.

Figure 5A:
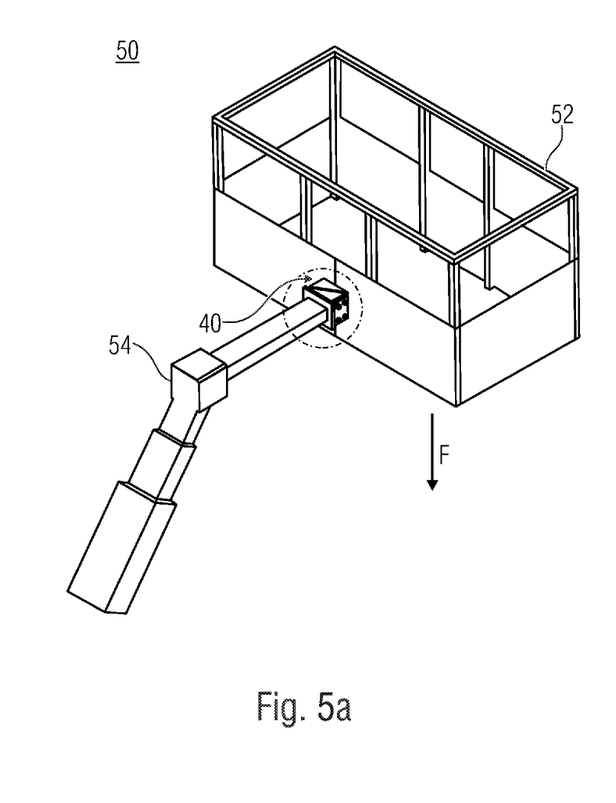
FIG. 5a is a schematic view of a load detection device in accordance with an embodiment.

FIG. 5a shows a schematic view of a load detection device 50 for a load 52, for example a working platform. The load detection device 50 comprises a mechanism 54, for example a crane mechanism for moving the working platform 52, that is the working platform 52 may be realized as a lifting platform. The crane mechanism 54 may be mounted to a base. The load cell 40 is arranged between the crane mechanism 54 and the working platform 52. The working platform 52 and the crane mechanism 54 are connected to each other by means of the load cell 40. This means that there is a mechanical connection between the working platform 52 and the crane mechanism 54 via the load cell 40. A force F may act on the working platform, for example by its weight and/or the cargo thereof, which results in loading on the crane mechanism 54 which may be detected using the load cell 40. Alternatively, any other (maybe external) force may act on the working platform and be detected.

Figure 5B:
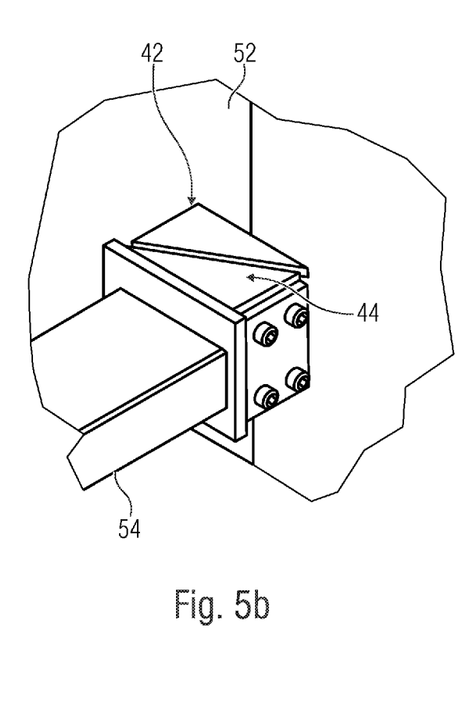
FIG. 5b shows a connection between a working platform and a crane mechanism of FIG. 5a in enlarged illustration.

FIG. 5b shows the connection between the working platform 52 and the crane mechanism 54 in enlarged illustration. The first side 42 of the load cell is connected to the working platform 52. The second side 44 of the load cell is connected to the crane mechanism 54. Exemplarily, folded sheets or other mechanical connective elements may be arranged to make a mechanical connection between the working platform 52 or the crane mechanism 54 and the load cell. The arrangement of the load cell 40 between the crane mechanism 54 and the working platform 52 allows detecting a load which the working platform 52 exerts on the crane mechanism, for example by a weight force of the working platform 52.

Figure 6:
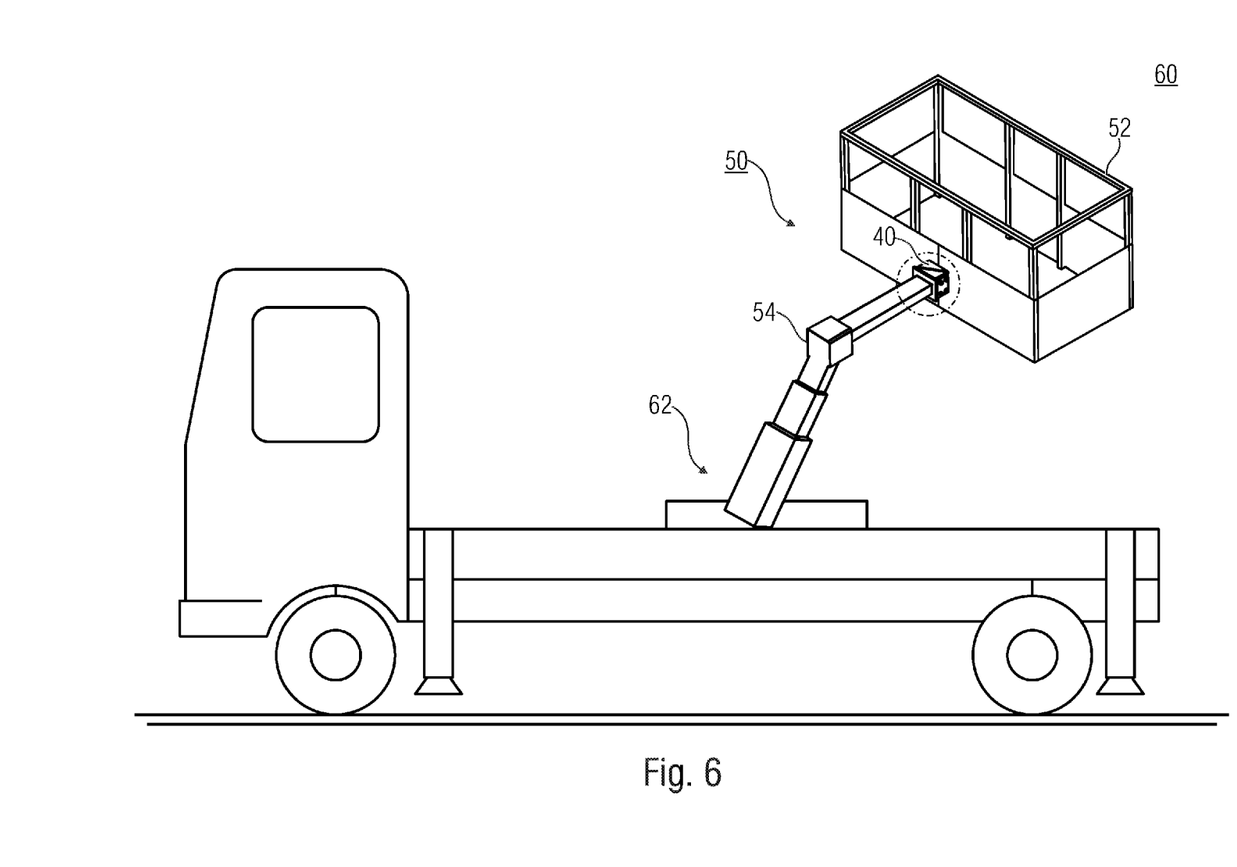
FIG. 6 is a schematic illustration of a vehicle in accordance with an embodiment.

FIG. 6 shows a schematic illustration of a vehicle 60 at the chassis of which the load detection device 50 is arranged. Here, the base of the crane mechanism 54 is, for example, mounted to the vehicle chassis 62. The electrical circuit of the load cell 40 may enable secure operation of the load detection device 50 and the crane mechanism 54 in a particularly simple and reliable manner, since function of the electrical circuit may be checked in every operating state of the crane mechanism 54, that is also in a loaded state thereof or in a loaded state of load cell 40, that is it may be determined whether there is a drift in the SG full bridge circuit.

The embodiments of FIGS. 5a, 5b and/or 6 may easily be transferred to other lifting machines.

Although some of the embodiments described herein relate to electrical circuits and/or load cells in combination with a vehicle, other embodiments relate to stationary systems. This means that a crane mechanism may also be realized as a (construction) crane or as a crane mounted to a building and be combined with a load cell described herein. In accordance with other embodiments, a loading state of any structure may be detected or monitored.

Embodiments described herein provide an indicator which allows recognizing a fault or damage of an equilibrium of the SG full bridge circuit and other Wheatstone bridge circuits and provides a corresponding signal irrespective of the load. Two auxiliary voltages form by the two voltage dividers in the resistor series connections. In an ideal full bridge, the difference between these two voltages is 0 V. This check voltage $U_{DRIFT}$ is used for characterizing a deviation as drift. Expressed more simply, a voltage of 0 V or approximately 0 V may be interpreted as "there is no drift" and a voltage of smaller than or greater than 0 V as "there is drift". The function of embodiments described herein is possible for unloaded SG full bridge circuits, loaded SG full bridge circuits and a change in a SG or reference resistor, irrespective of the loading. A change in SG may be detected and/or signaled by comparing means.

The zero drift of the cell, that is of the SG full bridge circuit, may be measured by means of a drift indicator in accordance with embodiments described herein at any time or any operating state, loaded or unloaded. This also means that, with this absolute value of the voltage $U_{DRIFT}$, the entire cell drift may be eliminated by calculations at any time or any operating state. By using two bridges, an SG measuring bridge and a reference measuring bridge which may comprise the resistors 24a-d, an alternating redundancy is realized, which allows mutual monitoring of the components. This also means that arranging a second SG full bridge may be omitted.

Some of the embodiments described before relate to exemplary values of physical quantities, like resistances and/or electrical voltages. These exemplary values, however, are not to be limiting, neither as regards sign nor value. It is to be understood that other values may be obtained based on other connections.

Although some aspects have been described in connection with a device, it is to be understood that these aspects also represent a description of the corresponding method such that a block or element of a device is to be understood to be also a corresponding method step or as a feature of a method step. In analogy, aspects having been described in connection with or as a method step also represent a description of a corresponding block or detail or feature of a corresponding device.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An electrical circuit comprising:
   a strain gauge full bridge circuit having a pair of voltage supply terminals and a pair of signal terminals;
   first resistors connected in series between the voltage supply terminals of the strain gauge full bridge circuit and comprising a first tap between two resistors;
   second resistors connected in series between the signal terminals of the strain gauge full bridge circuit and comprising a second tap between two resistors; and
   a comparer having a first input connected to the first tap and a second input connected to the second tap, wherein the comparer is configured to perform a comparison between a first voltage potential at the first tap and a second voltage potential at the second tap, and for providing an output signal corresponding to a drift of the strain gauge full bridge circuit from a determined reference state.

2. The electrical circuit in accordance with claim 1, wherein the comparer is configured so that, based on the comparison, the output signal indicates an error of one of the strain gauges of the strain gauge full bridge circuit.

3. The electrical circuit in accordance with claim 2, comprising an alarm signaling unit coupled to the output signal of the comparer and configured to provide an alarm signal based on the output signal.

4. The electrical circuit in accordance with claim 3, wherein the alarm signaling unit is configured to provide the alarm signal responsive to a condition of the output signal indicating an error of one of the strain gauges of the strain gauge full bridge circuit.

5. The electrical circuit in accordance with claim 1, wherein the comparer is configured so that, based on the comparison, the output signal indicates an error of one of the resistors of the first or the second series connected resistors.

6. The electrical circuit in accordance with claim 1, wherein the comparer is configured to correct the second voltage potential relative to a temperature-based change of a resistor of the first or the second series connected resistors in order to receive temperature information indicating a temperature at the resistor to be corrected, and to correct the temperature-based change of the resistor to be corrected based on the temperature information.

7. The electrical circuit in accordance with claim 1, wherein the comparer is configured to provide the output signal irrespective of a deformation of the strain gauges of the strain gauge full bridge circuit.

8. The electrical circuit in accordance with claim 1, wherein the comparer is configured to perform the comparison in a reference state and in a load state of the strain gauge full bridge circuit.

9. The electrical circuit in accordance with claim 1, wherein the comparer is configured to provide the output signal when a comparison value of the comparison reaches or exceeds a threshold value.

10. The electrical circuit in accordance with claim 1, wherein the comparer is configured to provide the output signal to indicate a no drift condition when the first voltage potential and the second voltage potential are equal, and to indicate a drift condition when the first voltage potential and the second voltage potential are not equal.

11. A load cell with a first side and a second side, comprising an electrical circuit in accordance with claim 1, and wherein the load cell is configured to provide a signal at the signal terminals of the strain gauge full bridge circuit based on a mechanical loading at the first side and a corresponding force acting on the second side.

12. A load detection device for a lifting machine, comprising:
    a mechanism for moving a load, wherein the mechanism may be mounted to a base; and
    a load cell according to claim 11 arranged between the mechanism and the load;
    wherein the mechanism and the load are connected to each other by the load cell.

13. The load detection device in accordance with claim 12, wherein the mechanism is a crane mechanism, and wherein the load is a working platform.

14. A vehicle comprising a load detection device in accordance with claim 12, wherein the mechanism is mounted to a vehicle chassis.

15. The electrical circuit in accordance with claim 1, wherein the first series connected resistors and the second series connected resistors each form a voltage divider at the first and the second taps at which the first and the second voltage potentials are obtained.

16. The electrical circuit in accordance with claim 1, wherein a difference between the first voltage potential at the first tap and the second voltage potential at the second tap of approximately 0 volts is associated with an error-free state.

* * * * *